United States Patent
Doshi et al.

(10) Patent No.: US 12,475,916 B2
(45) Date of Patent: *Nov. 18, 2025

(54) CONTEXT-BASED DETECTION OF END-POINT OF UTTERANCE

(71) Applicant: QUALCOMM Incorporated, San Diego, CA (US)

(72) Inventors: Paras Surendra Doshi, Mumbai (IN); Ayush Agarwal, Bangalore (IN); Shri Prakash, Dallas, TX (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 17/195,578

(22) Filed: Mar. 8, 2021

(65) Prior Publication Data

US 2021/0193176 A1 Jun. 24, 2021

Related U.S. Application Data

(63) Continuation of application No. 15/951,989, filed on Apr. 12, 2018, now Pat. No. 10,943,606.

(51) Int. Cl.
| | |
|---|---|
| *G10L 25/87* | (2013.01) |
| *G10L 15/05* | (2013.01) |
| *G10L 15/19* | (2013.01) |
| *G10L 15/22* | (2006.01) |

(52) U.S. Cl.
CPC ............. *G10L 25/87* (2013.01); *G10L 15/05* (2013.01); *G10L 15/19* (2013.01); *G10L 15/22* (2013.01); *G10L 2015/223* (2013.01)

(58) Field of Classification Search
CPC .......... G10L 25/87; G10L 15/05; G10L 15/19; G10L 15/22; G10L 2015/223
See application file for complete search history.

(56) References Cited

U.S. PATENT DOCUMENTS

| | | | |
|---|---|---|---|
| 6,246,981 B1 * | 6/2001 | Papineni | G10L 15/22 704/E15.04 |
| 7,430,510 B1 * | 9/2008 | De Fabbrizio | G10L 15/22 379/88.04 |
| 7,475,015 B2 | 1/2009 | Epstein et al. | |
| 9,437,186 B1 * | 9/2016 | Liu | G10L 15/05 |
| 9,502,024 B2 | 11/2016 | Pickering et al. | |

(Continued)

OTHER PUBLICATIONS

Sondheimer, N.K. et al., "Semantic Interpretation Using KL-ONE1", USC/Information Sciences Institute, 1984, pp. 101-107.

*Primary Examiner* — Feng-Tzer Tzeng
(74) *Attorney, Agent, or Firm* — QUALCOMM Incorporated

(57) ABSTRACT

Detecting an end-point of user's voice command or utterance with high accuracy is critical in automatic speech recognition (ASR)-based human machine interface. If an ASR system incorrectly detects an end-point of utterance and transmits this incomplete sentence to other processing blocks for further processing, it is likely the processed result would lead to incorrect interpretation. A method includes selecting a first semantic network based on context of the audio signal and more accurately detecting the end-point of user's utterance included in the audio signal based on the first semantic network and also based on at least one timeout threshold associated with the first semantic network.

20 Claims, 10 Drawing Sheets

(56) References Cited

U.S. PATENT DOCUMENTS

| | | | |
|---|---|---|---|
| 10,192,546 B1* | 1/2019 | Piersol | G10L 15/08 |
| 10,854,192 B1* | 12/2020 | Maas | G10L 15/26 |
| 10,943,606 B2* | 3/2021 | Doshi | G10L 15/19 |
| 2017/0069309 A1* | 3/2017 | Aleksic | G10L 15/26 |
| 2017/0140755 A1 | 5/2017 | Andreas et al. | |
| 2018/0232563 A1* | 8/2018 | Albadawi | G06F 1/3231 |
| 2019/0318759 A1 | 10/2019 | Doshi et al. | |
| 2020/0143112 A1* | 5/2020 | Martinez | G06F 40/295 |

\* cited by examiner

CONTEXT-BASED DETECTION OF END-POINT OF UTTERANCE

CLAIM OF PRIORITY

This is a continuation application of U.S. application Ser. No. 15/951,989 filed on Apr. 12, 2018, entitled "CONTEXT-BASED DETECTION OF END-POINT OF UTTERANCE," and assigned to the assignee hereof. The disclosure of the prior application is considered part of and is incorporated by reference into this patent application.

I. FIELD

The present disclosure is generally related to audio signal processing technology. More specifically, the present disclosure relates to automatic sound recognition method and system allowing improved user experience in one or more sound recognition applications.

II. DESCRIPTION OF RELATED ART

Speech recognition or automatic speech recognition (ASR) allows a user to control electronic devices via the user's voice command. ASR system takes an audio input signal which includes a voice command by a user, and aims to identify the voice command automatically. The identified voice command may be further processed by other signal processing blocks. For example, the identified voice command can be fed to a natural language understanding (NLU) block for further analysis.

ASR has been commercially deployed for many decades in various computing devices such as smartphones, tablets, and personal computers for its convenience over other interface methods. Conventional ASR, however, has limitation of understanding only small sets of keywords, which made it difficult for a user to communicate with devices in multi-turn conversations. Thanks to development in audio signal processing technology and recent breakthrough in machine learning technology such as Deep Neural Network (DNN) or Deep Learning Algorithms, ASR system is capable of understanding voice commands with more accuracy and with more flexibility allowing interactive voice response (IVR) communication or multi-turn conversations.

Detecting end-point of user's voice command or utterance with accuracy is critical in ASR-based human machine interface. When used in IVR communication or multi-turn conversations, detecting the end-point of the voice command or utterance is even more important. For example, a user may want to order a pizza via a ASR system by placing voice command of "Can I have a large . . . " followed by few seconds of silence deciding which types of pizza the user wants to order. If the ASR system interprets the silence as the end-point of utterance and transmits this incomplete sentence to other processing blocks, located either in a local device or in a cloud via a communication network, for further processing, it is likely the processed result would lead to incorrect interpretation, posing a potential risk of throwing away the already spoken command ("Can I have a large . . . ") out of conversation.

III. SUMMARY

In a particular aspect, a method includes receiving, by an automatic speech recognition (ASR) module, an audio signal representing an utterance, and selecting a first semantic network, which includes a plurality of slots, based on context of the audio signal. The method includes performing, by the ASR module, ASR processing on a first portion of the audio signal to generate a first ASR output. The method further includes determining, by a natural language understanding (NLU) module, the first ASR output corresponds to an incomplete sentence based on the first semantic network, and, in response to determination that the first ASR output corresponds to the incomplete sentence, increasing a first timeout threshold associated with the first semantic network.

In another particular aspect, a device is configured to receive, by an automatic speech recognition (ASR) module, an audio signal representing an utterance, and select a first semantic network, which includes a plurality of slots, based on context of the audio signal. The device is configured to perform, by the ASR module, ASR processing on a first portion of the audio signal to generate a first ASR output. The device is configured to determine, by a natural language understanding (NLU) module, the first ASR output corresponds to an incomplete sentence based on the first semantic network, and increase a first timeout threshold associated with the first semantic network, in response to determination that the first ASR output corresponds to the incomplete sentence.

In another particular aspect, an apparatus includes means for receiving, by an automatic speech recognition (ASR) module, an audio signal representing an utterance, and means for selecting a first semantic network, which includes a plurality of slots, based on context of the audio signal. The apparatus includes means for performing, by the ASR module, ASR processing on a first portion of the audio signal to generate a first ASR output. The apparatus further includes means for determining, by a natural language understanding (NLU) module, the first ASR output corresponds to an incomplete sentence based on the first semantic network, and means for increasing a first timeout threshold associated with the first semantic network, in response to determination that the first ASR output corresponds to the incomplete sentence.

In another particular aspect, a computer-readable storage device stores instructions that, when executed by a processor, cause the processor to perform operations receiving, by an automatic speech recognition (ASR) module, an audio signal representing an utterance, and selecting a first semantic network, which includes a plurality of slots, based on context of the audio signal. The operations also include performing, by the ASR module, ASR processing on a first portion of the audio signal to generate a first ASR output. The operations further include determining, by a natural language understanding (NLU) module, the first ASR output corresponds to an incomplete sentence based on the first semantic network, and increasing a first timeout threshold associated with the first semantic network, in response to determination that the first ASR output corresponds to the incomplete sentence.

Other aspects, advantages, and features of the present disclosure will become apparent after review of the application, including the following sections: Brief Description of the Drawings, Detailed Description, and the Claims.

IV. BRIEF DESCRIPTION OF THE DRAWINGS

V. DETAILED DESCRIPTION

Figure 1:
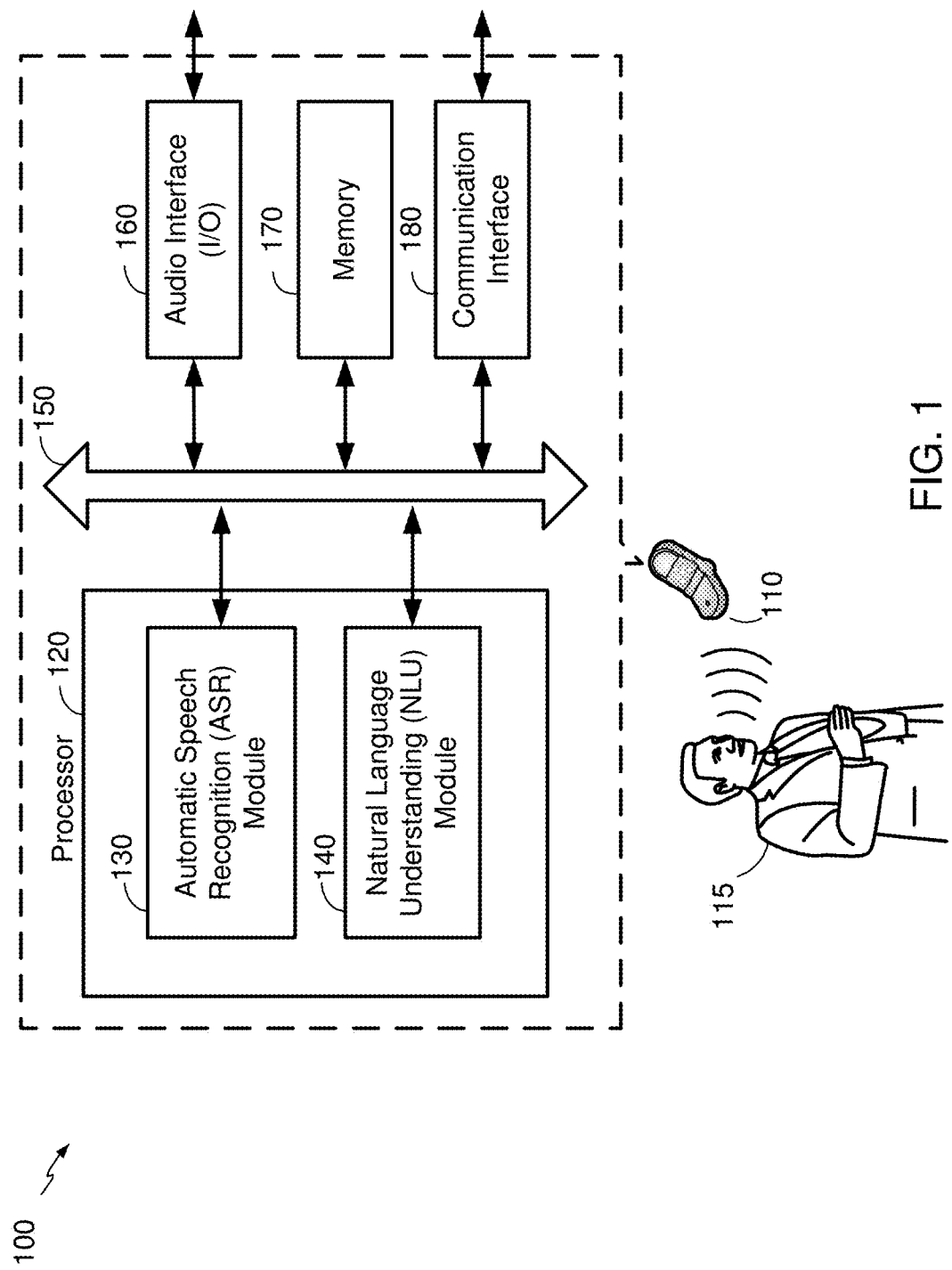
FIG. 1 is an illustrative block diagram of automatic speech recognition (ASR) system for detecting end-point of utterance.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise", "comprises", and "comprising" may be used interchangeably with "include", "includes", or "including." Additionally, it will be understood that the term "wherein" may be used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B").

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

In the present disclosure, systems and devices operable to detect end-point of utterance of a user's voice command are disclosed. In some implementations, detecting the end-point of utterance is based on context of the speech content including the utterance, as described further herein.

Detecting end-point of a user's utterance or voice command is critical to improve the accuracy of automatic speech recognition (ASR) system and to enhance user experience of using the ASR system. In one embodiment, the end-point detection may be implemented based on simple method of measuring silence period during a user's utterance. For example, a user may want to order a pizza by placing the following complete voice command ("Can I order a large thin crust pizza with a pineapple, an onion, and a green pepper?") to an ASR system. In a first scenario where the user takes too much pause or delay between "large" and "thin" (e.g., "Can I order a large [long silence] thin . . . ?"), the ASR system may determine the long silence period comes immediately after the "large" as the end-point of the user's voice command. In this example, the partial voice command ("Can I order a large") recognized by the ASR system lacks information about the item the user wants to order (e.g., pizza). Thus, the ASR system output based on this incomplete voice command, if processed by subsequent processing blocks without checking completeness of the voice command, may likely be quite different from the user's original expectation. In some implementations, if the ASR system is equipped with sentence completion checking mechanism, the ASR system, upon recognizing the voice command is incomplete, may prompt a follow up question asking the user for a confirmation, or asking the user to give another voice command for any missing information. In another implementation, the ASR system may require the user to speak the entire voice command all over again.

In a second scenario where a user takes too much pause or delay between "pizza" and "with" (e.g., "Can I order a large thin crust pizza [long silence] with . . . ?"), the ASR system may determine the long silence period comes immediate after the "pizza" as the end-point of the user's utterance. In this example, the partial voice command ("Can I order a large thin crust pizza") recognized by the ASR system failed to capture user's entire utterance as a single command but nonetheless it still includes information about the item the user wants to order (e.g., pizza). The ASR system output based on this incomplete voice command, if processed by subsequent processing, may or may not likely generate result that the user can accept it. However, whether the result was accepted or rejected by the user, it is obvious that the user's experience of interacting with the ASR system is less than ideal because the remaining voice command portion after the long silence ("with a pineapple, an onion, and a green pepper") was not processed by the ASR system as a single complete voice command with already processed partial voice command ("Can I order a large thin crust pizza").

Additionally, user's voice command may be preceded by a special keyword such that a target virtual assistant (e.g., Amazon's Alexa, Google's Assistant, Apple's Siri, and so on) can awake out of low-power state or alternatively be ready for processing of subsequent voice command. This special keyword may be pre-defined for each specific virtual assistant. Non-limiting examples of this pre-defined keyword may include "Hey Snapdragon," "Hey Ski," "Alexa," "Okay Google," and so on. Alternatively, this special keyword may be any keywords defined by a user (e.g., user-defined keyword).

FIG. 1 illustrates an example of an automatic speech recognition (ASR) system 100 for detecting end-point of utterance. The system 100 comprises automatic speech recognition (ASR) module 130 and natural language understanding (NLU) module 140. The system 100 may further include various other processing blocks such as audio interface (I/O) module 160, memory 170, memory interface module (not shown), communication interface module 180, and so on.

The audio I/O module 160 may include an audio front-end (AFE) module (not shown). The AFE module may include a digital-to-analog converter (DAC) and an analog-to-digital converter (ADC). The audio I/O module 160 may include at least one speaker and at least one microphone (a microphone array), not shown in FIG. 1. The at least one speaker and the at least one microphone may be coupled to DAC and ADC, respectively. The audio I/O module 160 may receive analog signals from the at least one microphone, convert the analog signals to digital signals using the ADC, and provide the digital signals to the ASR module 130 for automatic speech recognition processing. In some implementations, the NLU module 140 may provide digital signals to the audio I/O module 160. The audio I/O module 160 may convert the digital signals to analog signals using the DAC and may provide the analog signals to the at least one speaker. In a particular implementation, the at least one speaker may include audio headset coupled to the system 100 and the at least one speaker may be coupled to the system 100 via wireless connections such as Bluetooth or Wi-Fi.

The system 100 may include a communication interface module 180 coupled, via a transceiver (e.g., a transmitter, a receiver, or both), to an antenna, which is not shown in FIG. 1. The system 100 may include the memory 170, such as a computer-readable storage device. The memory 170 may include instructions, such as one or more instructions that are executable by the processor 120 to perform one or more of the techniques described further herein.

In a particular implementation, the ASR module 130 and NLU module 140 may be implemented by a single processor 120 or by a separate processor among a plurality of processors in the system 100. Alternatively, the NLU module 140 may be configured to be located outside a local device 110 and may be coupled to the ASR module 130 via the communication interface module 180. In another implementation, both the ASR module 130 and NLU module 140 may be configured to be located outside the local system 100, and coupled to the processor 120 via the communication interface module 180.

[ASR Module] When a user 115 of an electronics device 110 makes an utterance including a voice command, the ASR system 100 may recognize the utterance including the user's voice command, take actions in response to the recognized voice command, and present the result of the actions back to the user 115. The ASR system 100 may be implemented on a local device 110 such as a mobile device, a smartphone, a tablet, an embedded system, or a personal computer. Alternatively, the ASR system 100 may be implemented on a remote cloud system wherein at least one server coupled to another server through various network connections.

The ASR module 130 may receive an audio signal representing the utterance by the user 115 and may extract sound features from the received audio signal. The sound features, which is also frequently referred to as audio fingerprints, may include acoustic parameters characterizing the voice command (or utterance) of the audio signal. For instance, non-limiting examples of these sounds features may include pitch, formant, Mel-Frequency Cepstrum Coefficients (MFCC), zero-crossings, signal energy level, spectral tilt, linear predictive coding (LPC) coefficients, and a plurality of gains. The ASR module 130 may extract sound features from small chunks of the audio signal at every fixed time interval such as a frame or a subframe. For example, a typical frame size may be 10-20 msec and a typical subframe size may be 2.5-5 msec. The ASR module 130 may compare these extracted sound features with at least one sound model (or acoustic model) to identify candidate matching phonemes.

In one embodiment, the ASR module 130 may identify N number of best matching candidate(s) based on confidence score. The confidence score may be obtained by combining or accumulating confidence score for each individual phoneme. The ASR module 130 may compare this confidence score with a confidence threshold value to identify N-best matching phonemes. The confidence threshold value may be pre-determined or dynamically adapted depending on user's preference, prior history of utterances, or types of applications.

The ASR module 130 may further compare the identified phonemes with at least one language model to identify candidate matching keywords with improved accuracy. Exemplary language models may include acoustic models (or sound models) and language model. For example, acoustic models may be used to estimate the most likely acoustic matching based on the speech features of the audio signal. Language models may be used to estimate the probability for the speech features based on the knowledge of language and linguistic structure thereof.

Sound models (or acoustic models) and language models may be generated based on trainings of sample speech data. These trainings may be based on template matching techniques or stochastic approaches. For example, Hidden Markov Model (HMM) is based on stochastic method and models a phoneme with a probability distribution, usually Gaussian Mixture Model (GMM). With the introduction of HMM in automatic speech recognition, speech recognition problem may be reduced to statistical optimization problem where the goal of the optimization is to find best matching sequence of words, given audio input signal representing utterance and various models such as acoustic and language models.

The ASR module 130 may send the result of ASR processing to other blocks in the downstream processing of the ASR result. In some implementations, the other processing blocks may include NLU module 140, dialogue manager module 260, natural language generator (NLU) module 270, text-to-speech (conversion) module 280, or any other blocks that may be used to take an action in responsive to the recognized voice command. The ASR module 130 may send ASR processing result to other blocks at regular time intervals This time interval may be pre-determined or may be dynamically adjusted during the ASR processing. In some implementations, the ASR module 130 may send ASR processing result to other blocks when a certain condition is satisfied.

[NLU Module] The NLU module 140 may include a module for traditional natural language processing (NLP) as well as other components such as a processor, storage, other processing modules, etc. In accordance with the disclosure, the NLU module 140 may perform semantic interpretation operation based on recognized text from the ASR module 130 and produce semantic information. Semantic information may indicate some value associated with the content of speech or recognized output (or text) from the ASR module 130. For example, semantic tagging is a particular example of semantic interpretation operation. Semantic tagging is a process of recognizing specific meaning of words from an output of ASR processing, which is preferably performed by the ASR module 130, and of assigning a tag to those words, whereby the tag is a classification of the associated word. Semantic interpretation processing may generate semantic information based on semantic networks. More detailed examples of semantic networks are presented below with reference to FIGS. 3-7. Each tag may be associated with a corresponding slot or net in semantic networks. It is generally known that some words in a phrase may be considered less important and those words may not receive a tag or may be given a special catch-all tag.

Although it is quite common that the NLU module 140 may perform semantic interpretation, skilled in the art would understand it is also feasible for the ASR module 130, solely or in combination with the NLU module 140, to perform semantic interpretation and produce semantic information, such as semantic tags. If the ASR module 130 is at least partially responsible for semantic tagging, an ASR output produced from the ASR module 130 may include not only recognized texts but also semantic information associated with the text.

In one embodiment, end-point detection may be based on detecting the number of silence frames or the duration of non-speech activity. Silence frames may refer to the frame that does not include user's voice command or the frame that only includes background noise or ambient sounds. Voice activity detector (VAD) or any other known methods may be used to identify whether a particular frame is a silent frame or non-speech frame. For example, The ASR system 100, or preferably the NLU module 140 may detect the end-point by monitoring and/or tracking the number of consecutive silence frames. This scheme may be referred to as timeout (TO)-based end-point detection mechanism. The ASR system 100, or preferably the NLU module 140 may keep track of lapsed time (or "silence period") from the starting of the latest silence frame or alternatively from the ending of a user's last talk spurt. The lapsed time may be cleared or initialized at the beginning of new talk spurt. This lapsed time (e.g., silence or pause time from the end of a user's last talk spurt to the beginning of the new talk spurt) may be compared with a timeout threshold. If the lapsed time for the current silence period is greater than a timeout threshold, then the ASR system 100 or preferably the NLU module 140 may determine that an end-point of a user's voice command is detected, and may proceed with ASR processing for the audio signal corresponding to the recognized user's voice command. If the lapsed time for the present silence period (or latest silence period) is less than a timeout threshold, then the ASR system 100 or preferably the NLU module 140 may determine that an end-point is not detected. In such case, the ASR system 100, or preferably the NLU module 140 may continue to increase the lapsed time until a user's new talk spurt is detected. The ASR module 130 or the NLU module 140 may clear or initialize the lapsed time upon detecting the current frame contains a user's talk spurt.

The timeout threshold may be set to a predetermined value or may be dynamically adjusted based on context of a user's voice command. The context information may be obtained by the ASR module 130. Or alternatively context information may be obtained by the NLU module 140 and the context information may be provided back to the ASR module 130 for further processing. As a non-limiting example for the case where the timeout threshold is having a predetermined value, the timeout threshold may be set to either 600 msec or 30 consecutive silence frames (assuming each frame corresponds to 20 msec length), the ASR system 100 or preferably the NLU module 140 may detect end-point of a user's voice command when lapsed time exceed the timeout threshold. If the timeout threshold to determine end-point of a user's voice commend is set too small (e.g., 20-60 msec), then the user's entire utterance possibly intended to be a single voice command may not be captured as a single voice command. In such case, an ASR processing result may likely be rejected by the user. If the timeout threshold is set too large (e.g., 5-10 sec), then the ASR system may introduce large delay hindering a free-flowing conversational mode interaction.

Alternatively, the timeout threshold may be dynamically adjusted. In one embodiment, the timeout threshold may be adjusted based on multiple factors. As non-limiting examples, these factors may include at least one among a minimum timeout, a maximum timeout, semantic information of a user's voice command, historical data derived from the user's prior data, or any combination thereof.

In one embodiment according to the disclosure, the timeout threshold may vary depending on semantic analysis of recognized voice command. For example, semantic analysis may be performed by the ASR module 130 or by the NLU module 140. The semantic analysis may be based on semantic networks. Alternatively, the semantic networks may also be referred to as a grammar file. The semantic networks may be the collection of a plurality of semantic network and each semantic network may include a plurality of slots or nets. For example, semantic networks may be Recursive Transition Network (RTN). In some implementation, the NLU module 140 may select at least one semantic network among a plurality of semantic networks. For example, the NLU module 140 may select a first semantic network among a plurality of semantic networks based on context information of audio signal. For example, context information may indicate that a user is about to place an order for online shopping. Additionally, context information may further indicate which types of specific shopping the user wants to engage in (e.g., ordering a pizza, purchasing flight tickets, or purchasing concert tickets). Context information may be obtained after parsing some portion of ASR output according to predetermined grammar or syntax. Context information may be obtained either by the ASR module 130, or by the NLU module 140 after parsing some portion of ASR output according to predetermined grammar or syntax.

The ASR system 100 may have a separate semantic network corresponding to each business category or product category. For instance, the ASR system 100 may have a first semantic network for pizza shopping and a second semantic network for a flight ticketing. Alternatively, or additionally, the ASR system 100 may have a separate semantic network corresponding to a separate command indicating different actions. Examples of such actions may include "Open YouTube," "Call Anthony," "Set a reminder tomorrow morning." In some implementations, each semantic network may have a different timeout threshold value pre-assigned per each slots or nets thereof. More examples and explanations about semantic networks are presented herein with reference to FIGS. 3-7.

The ASR module 130 and the NLU module 140 may be connected to other processing components 160, 170, 180 via a bus 150. The ASR module 130 may receive the audio signal from the audio interface module 160 or communication interface module 180. The ASR module 130 may output an ASR result to the audio interface 160 or to another local or cloud devices via communication interface module 180. Although the memory 170 is depicted inside a mobile device 110 in FIG. 1, it should be understood that the memory 170 may be alternatively located in a cloud (not shown) or, additionally, may be located within either the ASR module 130 or the NLU module 140. The memory 170 may store information required for ASR processing or NLU processing. In some implementations, this information may include, as a non-limiting example, acoustic model, language model, semantic networks, and program instruction for ASR and NLU processing.

Figure 2:
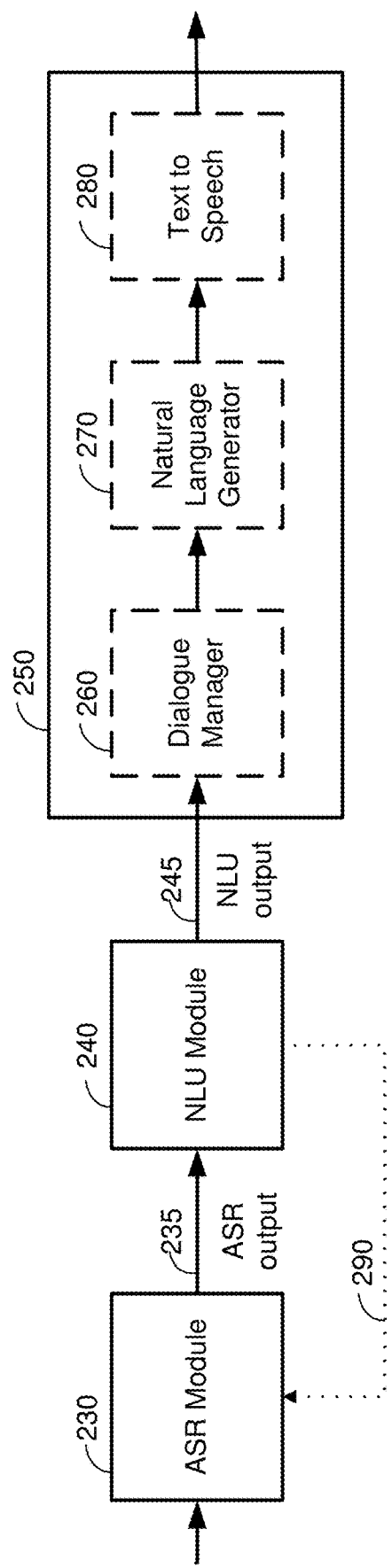
FIG. 2 is another particular illustrative block diagram of automatic speech recognition (ASR) system for detecting end-point of utterance.

FIG. 2 illustrates another particular example of automatic speech recognition (ASR) system 100 for detecting end-point of utterance. FIG. 2 includes the ASR module 230, the NLU module 240, and other downstream processing block 250. For example, the other downstream processing block 250 may further include dialogue manager (DM) 260, natural language generator (NLG) 270, and text-to-speech (TTS) conversion module 280. The ASR module 230 and the NLU module 240 may be similar to the ASR module 130 and the NLU module 140 as it was described with respect to FIG. 1. The ASR module 230 may generate an ASR output 235 and provide it to the NLU module 240.

The NLU module 140 240 may perform semantic interpretation operation, for example, such as semantic tagging process, based on recognized text from the ASR module 130 and produce semantic information. Based on the semantic information, the NLU module 140 240 may determine whether end-point of an utterance is detected. The NLU module 140 240, in response to determination the end-point of an utterance is detected, may generate an NLU output 245 and provide it to further downstream processing block 250. For example, an NLU output 245 may be provided to the dialogue manager 260 for additional processing.

Dialogue manager (DM) 260 may be a component of a complex dialog system and it generally determines what actions need to be taken based on the flow of conversation. The input to the DM 245 may be system-specific semantic representation of utterance produced by the NLU module 140 240. For example, in a flight-ticketing dialog system, the input may look like the following: "TICKET_ORDER (From="San Diego," To="Philadelphia," Date="2/13/2018")." The DM 260 usually maintains state information, such as the dialog history, the latest unanswered question, etc. State information may enable a dialog system to interact with a user more naturally. For example, in an application where several answers are possible to a particular voice command, the DM 260 may select the best answer for the voice command based on a certain rule. However, if, state information, which is maintained based on the prior dialog history, shows the best answer was already used, then the DM 260 may select the $2^{nd}$ best answer to the voice command. The output of the DM 260 may be a list of instructions to other parts of dialog system, usually in a semantic representation. For example, in a flight-ticketing dialog system example above, the output of the DM 260 may be as follows: "TELL(Flight-Num="KE202," Flight-Time="7:40")." This semantic representation is usually converted to human language by the natural language generator (NLG) 270.

Natural language generator (NLG) 270 has existed for a long time but commercial NLG technology has only recently become widely available in many applications such as smart speakers or virtual assistant applications. NLG 270 may generate natural language in machine representation system based on a knowledge base or a logical form. The typical processing of NLG 270 may be viewed as the opposite of the processing by the NLU module 140 240. For example, one of the objectives of the NLU module 140 240 is to disambiguate an input sentence (or voice command) to produce machine representation language (or semantic representation) whereas one of the objectives of NLG 270 is to make decisions about how to put a concept represented by machine language (or semantic representation) into words or texts that may be presented to human through text-to-speech conversion.

Text-to-speech (TTS) conversion module 280 converts words or texts processed by a dialog system and represented by machine language (or semantic representation) into artificially generated speech. For example, TTS conversion module 280 receives the natural language generated by NLG 270 as an input and converts it into synthesized speech. TTS conversion module 280 may be one of many commercially known speech synthesizers and may be implemented by either hardware or software. In some implementations, TTS conversion module 280 may be comprised of multiple parts responsible for various processing routinely performed in synthesizing speech signal such as pre-processing, text normalization, text-to-phoneme conversion, and waveform generation.

The NLU module 140 240 may provide a feedback signal 290 to the ASR module 130 230. As described above, the feedback signal 290 may include context information estimated by the NLU module 140 240. For example, the feedback signal 290 may include the context information indicating the context of a user's utterance (or voice command) is product purchasing (e.g., pizza order, flight reservation, or movie ticket reservation). Alternatively, or additionally, the feedback signal 290 may include semantic information of a user's utterance (or voice command) produced by the NLU module 140 240 as described above. For example, the semantic information may indicate a particular semantic network selected based on the product purchasing context such as pizza order, flight reservation, or movie ticket reservation. The semantic information may also include tagging status associated with at least one net or slot in the selected network. In some implementation, the context information or semantic information in the feedback signal 290 may be used to detect an end-point of a user's voice command. For example, the context information or semantic information in the feedback signal 290 may be used to adjust at least one timeout threshold associated with any particular slot or net of a semantic network as described below with respect to FIG. 7. In some implementation, the context information or semantic information in the feedback signal 290 may also be used for the ASR module 130 230 to detect the end-point of a user's voice command more accurately by comparing at least one timeout threshold of the selected semantic network with the duration of the latest silence period.

Figure 3:
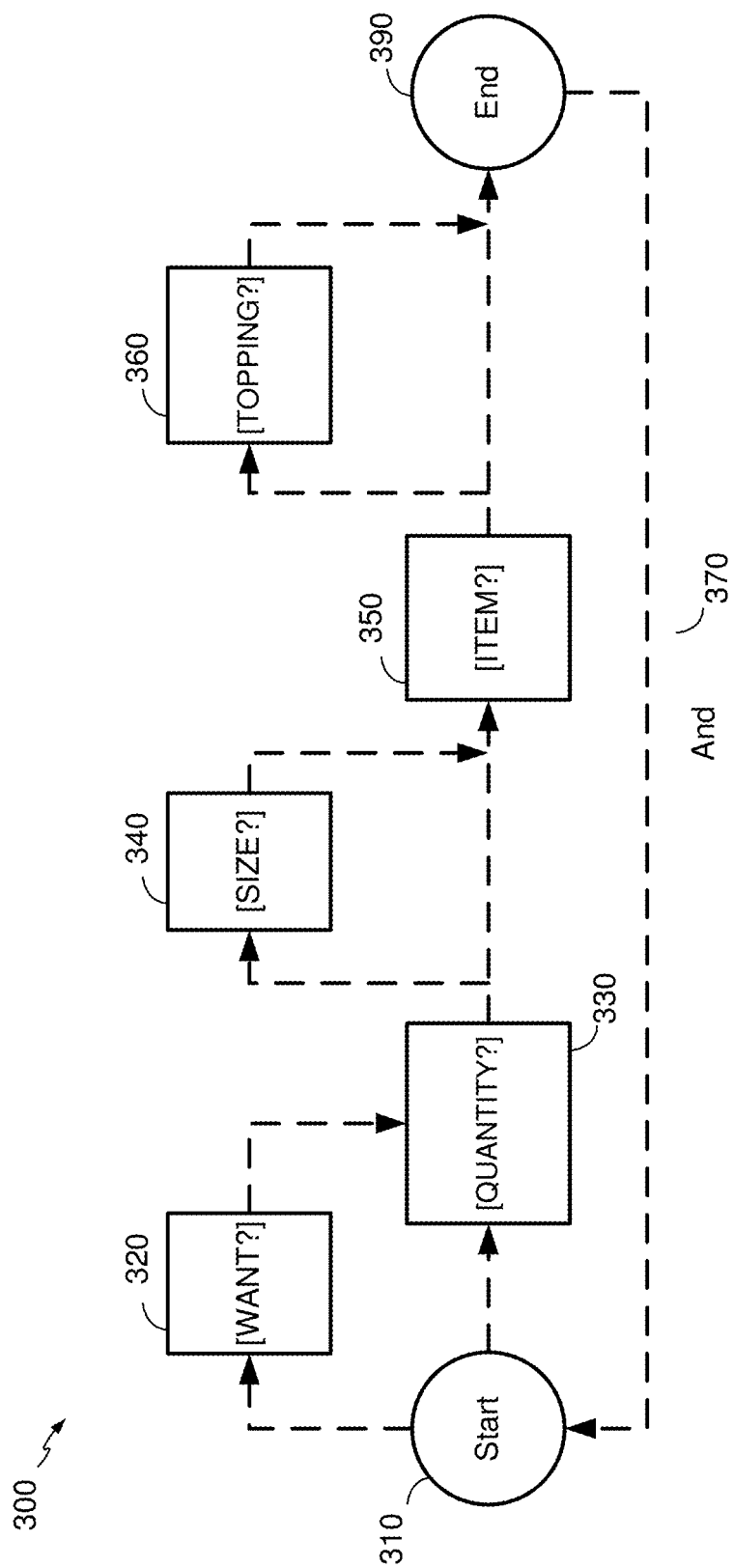
FIG. 3 is an exemplary semantic network pertaining to pizza order context.

FIG. 3 shows an exemplary semantic network pertaining to a particular context (e.g., pizza order) in accordance with the present disclosure. Semantic networks are the collection of each semantic network. Semantic networks may be referred to as a "gramma file," and each semantic network in a gramma file may be frequently referred to as a "frame" in natural language understanding application. A gramma file may be stored in the memory 170, and may be accessible by the ASR module 130 230 or the NLU module 140 240. A frame in a gramma file is a slot-based or net-based network and may be used, by the NLU module 140 240, to determines whether a user's voice utterance constitutes a complete sentence or not.

In a preferred embodiment, a gramma file may comprise a plurality of "frame (or semantic network)" such that each of the frame corresponds to a particular context information of input audio. For example, context information may indicate the input audio corresponds to "business context" or "personal context." Context information may further provide finer granularity. For example, context information indicating the input audio corresponding to business context may further provide specific type of business context. For instance, a gramma file (or semantic networks) may have a first semantic network for pizza shopping and a second semantic network for a flight ticketing. Alternatively, or additionally, a gramma file (or semantic networks) may have a separate semantic network corresponding to each of commands indicating different actions. For example, these actions may include "Open YouTube ("OPEN an application")," "Call Anthony ("CALL someone")," "Set a reminder tomorrow morning ("CHANGE setting")."

Each frame or semantic network may include a plurality of slots or nets. A net or slot may be a placeholder for at least one input word or phrase. All the slots or nets in a single frame, if put together, may be sufficient to convey the meaning of a sentence. Each frame may contain a plurality of compulsory net(s) for some words in a phrase that may be important or necessary to complete a sentence, or additionally optional net(s) for some words that may be considered less important in the phrase. A frame may additionally include special nets, for example, such as "Start," "And," "End," and a special catch-all tag.

Returning to FIG. 3, each box or circle in FIG. 3 may correspond to a net or a slot in a particular frame 300 for food item (e.g., pizza) ordering context. The frame 300 includes compulsory nets such as [QUANTITY?] 330 and [ITEM?] 350, and optional nets such as [WANT?] 320, [SIZE?] 340, and [TOPPING?] 360. The frame 300 additionally includes special nets such as Start net 310, End net 390, and And net 370. For example, Start net 310 may be used to indicate the beginning of a new sentence, and End net 390 may be used to indicate the completion of the sentence. The And net 370 may be a special net indicating that a user's voice command is a semantically complete sentence (e.g., all compulsory nets have been "filled") but the user continues to speak more and thus there is a need to create another frame to capture a new voice utterance (e.g., a second order, or a supplemental command to the first order). In some implementations, the new frame may have the same frame structure as that of the previous frame, or may have a different frame structure depending on whether context information change has been detected or not. For example, when a user's voice command includes two separate but complete sentences such as "Can I have two pizzas and one large portion of garlic bread?" the ASR system 100, in response to detecting the presence of "and" and in response to the determination that the first sentence prior to "and" is complete sentence, may create two copies of the same frame 300, one for each complete sentence. The ASR system 10 then may attempt to fill any untagged nets for each of the two frames independently by asking questions such as "What size and topping for pizzas?" and "Any toppings for garlic bread?".

Compulsory nets are the ones that need to be "filled" or "tagged" before completion of a sentence. Semantic tagging may refer to the process of assigning a tag or a label to a particular net in response to determination specific meaning of words or a phrase associated with the particular net has been identified from a user's utterance. For example, for the frame 300 to traverse from Start net 310 to the End net 390 (i.e., for the NLU module 140 240 to determine if the recognized text from the ASR module 130 230 is complete sentence), both [QUANTITY?] net 330 and [ITEM?] net 350 must be filled or tagged. Optional nets are the ones that tagging of them may be advantageous in understanding the meaning of a sentence but is not required to determine a user's utterance is a complete sentence (i.e., reach the End net 390).

In one scenario, a user may want to order a pizza by placing the following a voice command ("Can I order a large thin crust pizza with a pineapple, an onion, and a green pepper?") to an ASR system 100. For illustration purpose, it is assumed the ASR system 100 may have already identified context information (e.g., pizza ordering conversation), and subsequently may have already selected a particular frame 300 based on the context information in a gramma file. Upon receiving the user's voice command, the ASR module 130 230 in the ASR system 100 may perform ASR processing on the received user's voice command, and may generate the ASR output 235 (e.g., recognized text from the ASR processing). In some implementation, the ASR module 130 230 may generate the ASR output 235 at regular time interval or when a certain condition is satisfied. If the NLU module 140 240 successfully detects the end-point of user's utterance, the NLU module 140 240 may generate the NLU output 245 such the entire voice command ("Can I order a large thin crust pizza with a pineapple, an onion, and a green pepper?") is included in a single NLU output 245. However, if a user takes too much pause or long silence between "pizza" and "with a pineapple, an onion, and a green pepper," then it may be possible for the NLU module 140 240 to determine the user's voice command ends immediately after "pizza," in which case the NLU output 245 may include only a partial voice command ("Can I order a large thin crust pizza?").

The ASR system 100, or preferably the NLU module 140 240, may determine, based on the selected frame 300, whether at least one recognized text received from the ASR module 130 230 is semantically complete sentence by progressively analyzing portions of the at least one recognized text. For example, the semantic analysis or tagging process may start from an initial net (i.e., Start net 310). Regarding the voice command ("Can I order a large thin crust pizza with a pineapple, an onion, and a green pepper?"), the ASR module 130 230 may recognize an initial portion of the user's voice command, and may send a first recognized text (e.g., "Can I order") to the NLU module 140 240 at a first interval. Based on the first recognized text ("Can I order"), the NLU module 140 240 may perform semantic tagging process and determine [WANT?] net 320 is filled or tagged (i.e., [WANT="can I order"]). Then, the ASR module 130 230 may recognize a next portion of the user's voice command, and may send a second recognized text (e.g., "a large thin crust pizza") to the NLU module 140 240 at a second interval. If the second recognized text ("a large thin crust pizza") is received within a permitted time limit, the NLU module 140 240 may continue to tag other nets in the frame 300 as follows: [QUANTITY="a"], [SIZE="large"], and [ITEM="thin crust pizza"]. Finally, the ASR module 130 230 may recognize the last portion of the user's voice command, and may send a third recognized text (e.g., "with a pineapple, an onion, and a green pepper") to the NLU module 140 240 at a third interval.

In this example, if the third recognized text was indeed received within a permitted time limit, the NLU module 140 240 may complete tagging for [TOPPING?] net 360 as follows: [TOPPING="with a pineapple, an onion, and a green pepper"]. Since all compulsory and optional nets have been tagged, the NLU module 140 240 now can find the combination of all three recognized texts (i.e., the first, second, and third the recognized texts) may constitute a semantically complete sentence. In case the third recognized text was received outside a permitted time limit, the NLU module 140 240 may not be able to tag [TOPPING?] net 360 based on the third recognized text in a timely manner. The NLU module 140 240, however, can still find the combination of the first and second the recognized texts may constitute a semantically complete sentence because at least all the compulsory nets (e.g., [QUANTITY="a"] 330, and [ITEM="thin crust pizza"] 350) have already been tagged, although one of the optional nets (e.g., [TOPPING?] net 360) still remained untagged.

The frame 300 in FIG. 3 is just an exemplary frame presented merely for the purpose of illustration. It should be understood by skilled in the art that various omissions, substitutions, or changes to the net configuration may be possible without departing from the spirit of the present disclosure. For example, any of the following nets such as [WANT?] net 320, [SIZE?] net 340, [TOPPING?] net 360 may be treated as compulsory net(s), or alternatively may be omitted from the frame 300.

Figure 4:
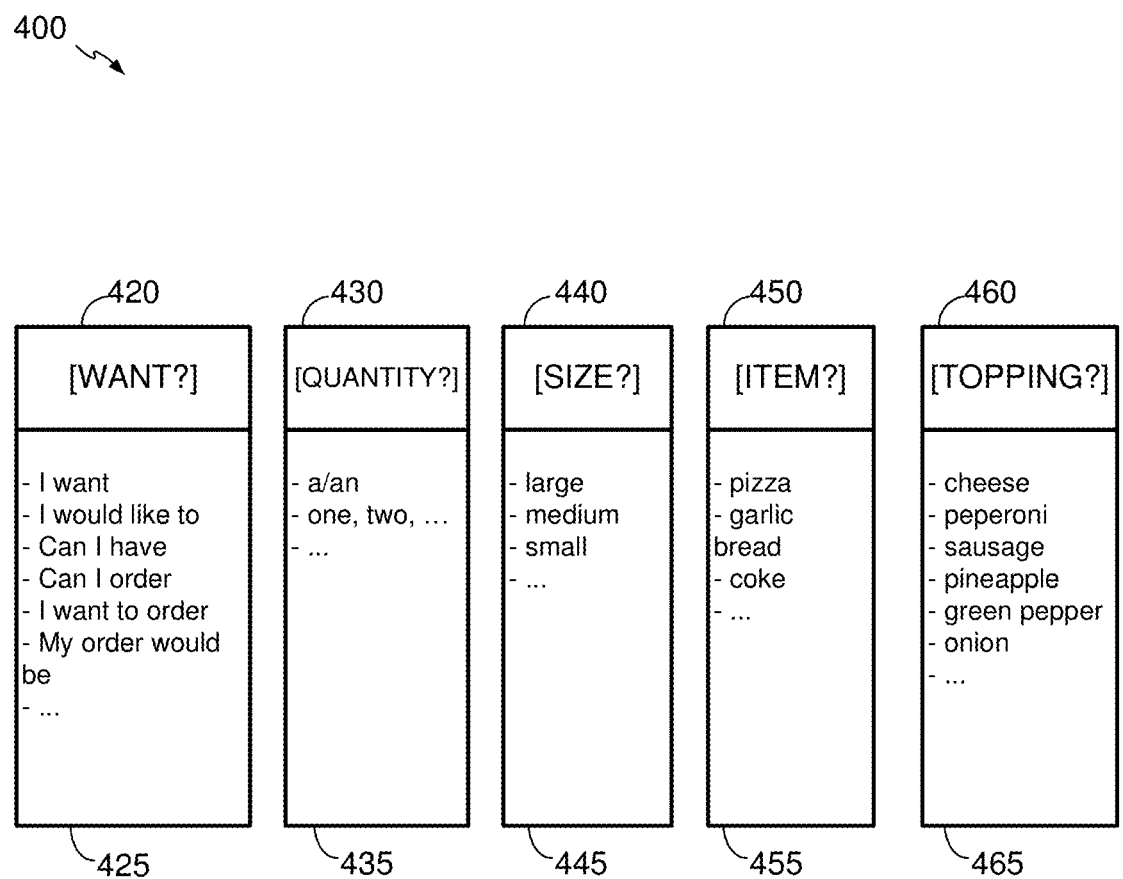
FIG. 4 is an illustrative example of slots or nets of a semantic network pertaining to pizza order context.

FIG. 4 is an illustrative example of slots or nets for a semantic network or frame 300 pertaining to pizza order context. An ASR system 100 may store information 400 in the memory 170 indicating which words or phrases may be associated with which slots or nets in a particular frame in a gramma file. For example, the memory 170 may include information indicating that [WANT?] net 420 may be associated with any one of the words or phrases 425 such as "I want," "I would like to," "can I have," and so on. In a similar token, the memory may further include information indicating which words or phrases are associated with [QUANTITY?] net 430, [SIZE?] 440, [ITEM?] net 450, or [TOPPING?] net 460. The information 400 may be stored in a form of look-up table (LUT) or in any other suitable data structure form suitable for indicating the connection between nets 420 430 440 450 460 of any particular frame and their corresponding candidate words or phrases 425 435 445 455 465. The information 400 may also be stored in either a local memory or in a cloud memory connected via communication interface module 180. The information 400 may be pre-determined based on samples of training data for any particular context information on which a particular frame is selected. In some implementation, the information 400 may be updated based on a user's prior history of utterance.

Figure 5:
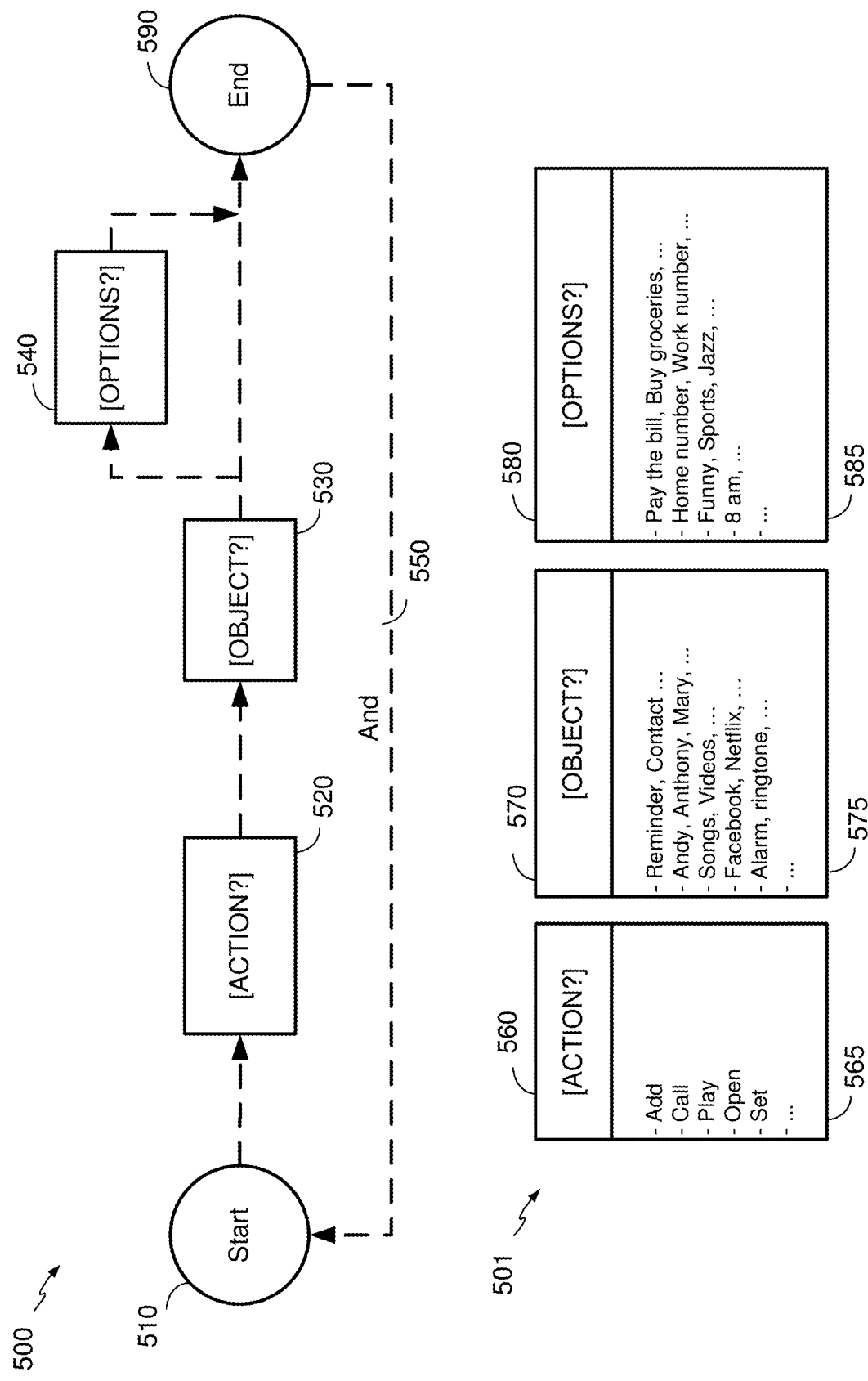
FIG. 5 illustrates an example of another semantic network and slots or nets thereof.

FIG. 5 illustrates an example of another semantic network or frame 500 pertaining to another context (e.g. command indicating an "action"). Similar to the frame 300 for pizza order context in FIG. 3, the frame 500 includes special nets such as Start net 510, End net 590, and And net 550. The frame 500 further includes compulsory nets like [ACTION?] net 520 and [OBJECT?] net 530, and an optional net like [OPTIONS?] net 540. FIG. 5 shows information 501 indicating which words or phrases are associated with which slots or nets for the frame 500 pertinent to this context information. For example, an ASR system 100 may define some words or phrases indicating some action commands 565, such as "add," "call," "play," "open," and "set," to be associated with [ACTION?] net 520 560. Likewise, an ASR system 100 may also define various words or phrases indicating target(s) 575 of relevant action command(s) 565 to be associated with [OBJECT?] net 530 570.

In some implementations, the information 501 may also indicate which action commands can be semantically related with which type of objects. For example, "add" action command 565 may be used in conjunction with specific objects or targets such as "a reminder," or "Anthony to the contact list" 575, but not in conjunction with some other objects or targets 575. In a similar manner, "call" action command 565 may only be used in conjunction with either name or phone number of a target person to be called 575. In some implementations, the frame 500 may be a miscellaneous frame or a catch-all frame intended to capture for various actions related with any behavior change in any stage of processing.

Figure 6:
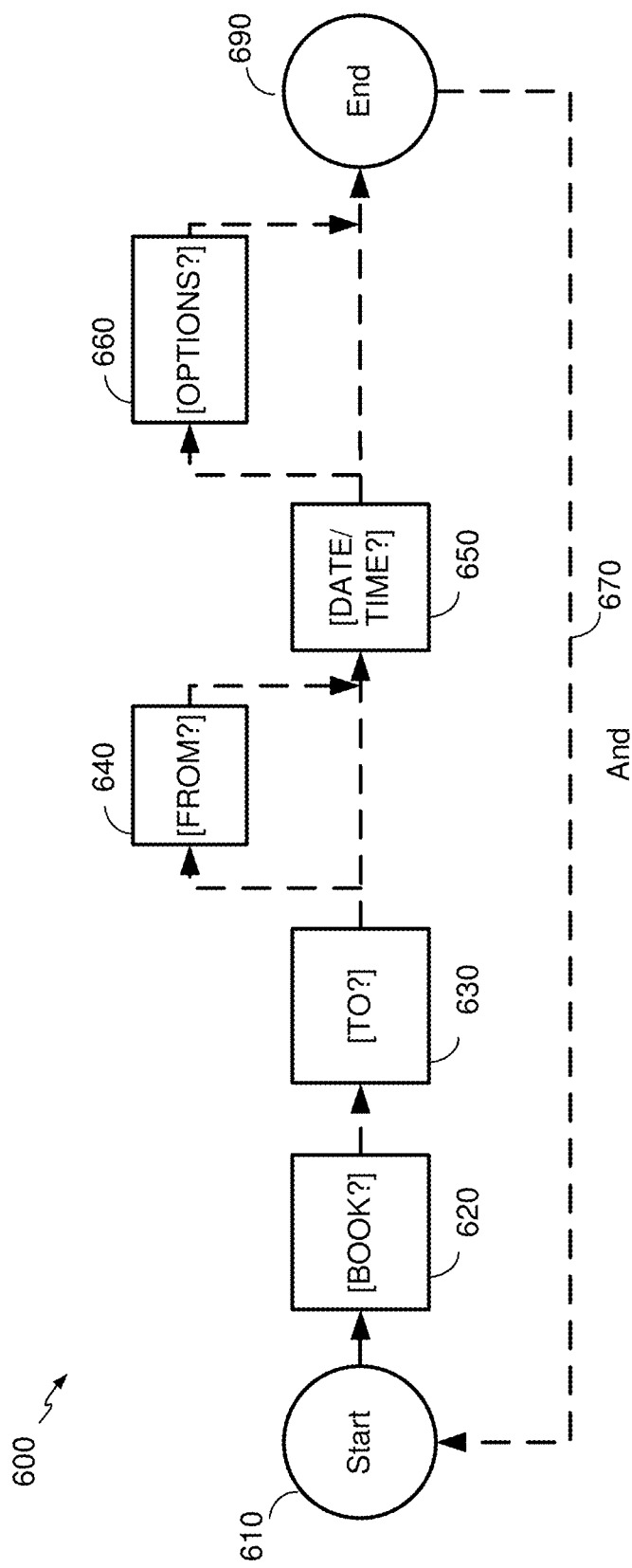
FIG. 6 is another exemplary semantic network pertaining to flight ticketing context.

FIG. 6 illustrates another exemplary semantic network or frame 600 pertaining another context (e.g., purchasing a flight ticket context). As it was already described above, an ASR system 100 may select the frame 600 among a plurality of frames in a grammar file based on identified context information. The exemplary context information on which the frame 600 is selected in FIG. 6 may be any of the following contexts such as business context, purchasing context, ordering a product context, or more specifically purchasing a flight ticket context. Similar to the frames in FIGS. 3 and 5, the frame 600 includes special nets like Start net 610, End net 690, and And net 610. The frame 600 further includes compulsory nets like [BOOK?] net 620, [TO?] net 630, and [DATE/TIME?] net 650, and optional nets like [FROM?] net 640 and [OPTIONS?] net 660. For example, the words or phrase associated with [OPTIONS?] net 650 may include "extra baggage," or "in-flight meals." The And net 610, for example, may be used for booking a return ticket, booking a cab to an airport, requesting for special assistance at the airport, or any other things.

FIG. 6 shows [FROM?] net 640 is categorized as optional nets whereas [TO?] net 630 is categorized as compulsory nets (i.e., [TO?] net 630 is located in the shortest path from Start net 610 to End net 690). This difference may be based on presupposition that estimating the departure of the flight (e.g., [FROM?] 640) is easier than estimating the destination of the flight (e.g., [TO?] 630). For example, the departure may be estimated based on the nearest airport to a user's current location. or alternatively the departure may be estimated based on the previous flight information of a user. The frame 600 in FIG. 6 is merely presented for the purpose of illustration. It should be understood that various omissions, substitutions, or changes to the net configuration may be possible without departing from the spirit of the present disclosure.

Figure 7:
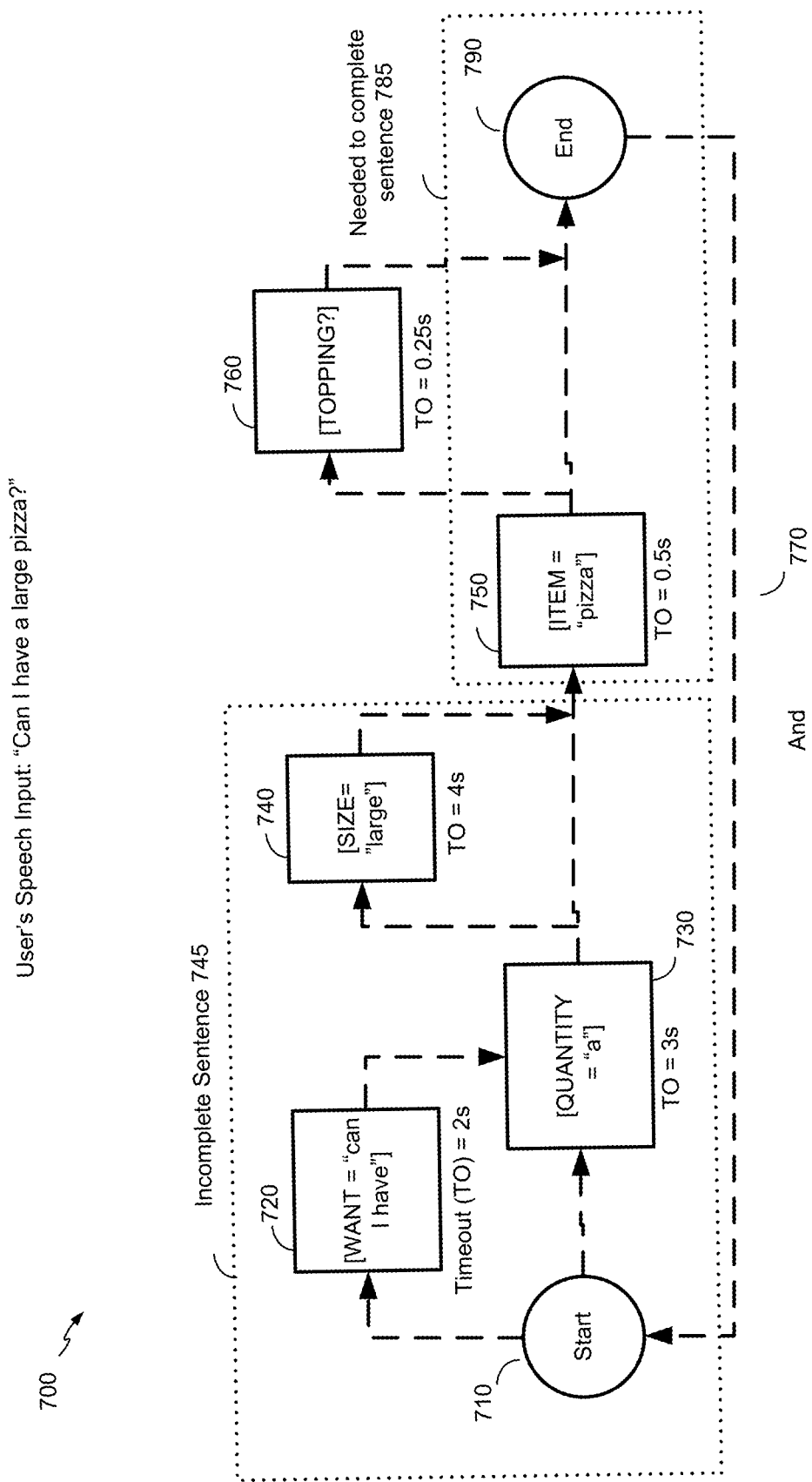
FIG. 7 is another example of a semantic network pertaining to pizza order context illustrating exemplary timeout threshold information.

FIG. 7 shows another example of a semantic network or frame 700 pertaining to pizza order context illustrating exemplary timeout threshold information. The frame 700 in FIG. 7 has frame structure quite similar to that of the frame 300 in FIG. 3 in the sense that it includes same compulsory nets, optional nets, and special nets. In addition, the frame 700 further shows each box of the frame 700 has its own timeout (TO) threshold. In some implementation, the timeout threshold may be pre-determined or may be dynamically adjusted. The timeout threshold may be determined based on trainings or semantic analysis of sample database. The timeout threshold may be adjusted based on multiple factors. As non-limiting examples, these factors may include at least one among a minimum timeout, a maximum timeout, semantic information of a user's voice command, historical data derived from the user's prior data, or any combination thereof. In another implementation, all nets in a frame may have same timeout threshold or preferably they may have different timeout thresholds.

Returning back to FIG. 7, [WANT?] net 720 has a timeout threshold of 2 seconds and the [SIZE?] net 740 has a timeout threshold of 4 seconds. Timeout threshold may be used for an ASR system 100 to detect end-point of utterance. The ASR system 100, preferably the NLU module 140 240, may keep track of a silence period. In some implementation, the silence period may be the number of consecutive silence frames or time lapsed from the ending of a user's last talk spurt. The silence period may be compared with a timeout threshold. For example, the NLU module 140 240 may compare the silence period with the timeout threshold associated with a current net or slot in a frame. When the NLU module 140 240 starts semantic tagging process, the current net may be Start net 701. As the NLU module 140 240 progressively continues tagging other nets, the current net may be the net that was last tagged.

In a scenario where a user wants to order a pizza by placing the following voice command ("Can I have a large pizza?") to an ASR system, let's assume the NLU module 140 240 just successfully completed semantic tagging process for the entire voice command as follows: [WANT="can I have"], [QUANTITY="a"], [SIZE="large"], and [ITEM="pizza"]. Since both compulsory nets ([QUANTITY="a"] 730 and [ITEM="pizza"] 750) have been tagged, the NLU module 140 240 may be able to declare the voice command is a complete sentence. This tagging process for the voice command ("Can I have a large pizza?") in view of timeout thresholds is explained step by step below.

First, the NLU module 140 240 may start tagging process from Start net 710 at time T0. At this time, Start net 710 may be called as the current net. Let's assume the ASR module 130 230 sends an ASR output 235 that includes a recognized text for a first portion of the voice command (e.g., "can I have") to the NLU module 140 240 at time T1. Then, the NLU module 140 240 may be able to tag [WANT?] net 720 as follows: [WANT="can I have"] because the phrase "can I have" is one of the phrases 425 associated with [WANT?] net 320 420 720 as presented in FIG. 4. At this time, the current net indicates or points to [WANT?] net 720, and the timeout threshold of the current net (i.e., [WANT?] net 720) becomes the current timeout threshold (i.e., 2 seconds) for the frame 700.

Second, at T2, the ASR module 130 230 sends an ASR output 235 that includes a recognized text for a second portion of the voice command (e.g., "a") to the NLU module 140 240. T2 may be expressed as follows: T2=T1+delta1, where delta1≥0. If delta1=0 (i.e., T2 is same as T1), it indicates the second portion of the voice command (e.g., "a") was sent to the NLU module 140 240 at the same time as the first portion of the voice command (e.g., "can I have"), possibly in same ASR output 235. If delta1≠0 (i.e., T2 is different than T1), it indicates the second portion of the voice command (e.g., "a") was sent to the NLU module 140 240 after the first portion of the voice command (e.g., "can I have") was sent to the NLU module 140 240.

The NLU module 140 240 may keep track a silence period between the ending of the last talk spurt ("can I have") and the starting of the new talk spurt. At T2, the silence period is the time between "can I have" and "a." If the silence period is less than the current timeout threshold (i.e., 2 seconds), the NLU module 140 240 may be able to tag the following net [QUANTITY?] net 730 with "a" as follows: [QUANTITY="a"] based on the information 400 in FIG. 4. At this time, the current net indicates or points to [QUANTITY?] net 730, and the timeout threshold of the current net (i.e., [QUANTITY?] net 730) becomes the current timeout threshold (i.e., 3 seconds) for the frame 700. If the silence period is longer than the current timeout threshold (i.e., 2 seconds), the NLU module 140 240 may incorrectly determine an end-point of a user's voice command is detected, and may transmit the sentence that includes only "can I have" to other downstream processing block 250 as part of the NLU output 245 for further processing. Transmitting this seeming incomplete sentence to other downstream processing block is clearly incorrect interpretation of user's intent by the ASR system 100, and it may pose risk of throwing off the entire natural conversion out of due course.

In accordance with the present disclosure, the NLU module 140 240 may determine the sentence having only "can I have" as an incomplete sentence because the current net still points to [WANT?] net 720, or because none of the two compulsory nets ([QUANTITY="a"] 730 and [ITEM="pizza"] 750) have been tagged. The NLU module 140 240 then alternatively may decide not to transmit the incomplete sentence to other downstream processing block 250. The NLU module 140 240 may instead ask the user a follow up question for more information about unflagged nets, for example, such as [QUANTITY?] net 730 and [ITEM?] net 750. In another implementation, in response to determination that the silence period is longer than the current timeout threshold (i.e., 2 seconds) and in response to the determination that at least one of the two compulsory nets ([QUANTITY="a"] 730 and [ITEM="pizza"] 750) is still untagged, the NLU module 140 240 may augment or increase the current timeout threshold. For example, the NLU module 140 240 may increase the current timeout threshold from 2 seconds to 3 seconds in which case there is higher probability the NLU module 140 240 may be able to tag [QUANTITY?] net 730 based on the second portion of the voice command (e.g., "a").

In a similar manner, the remaining voice command ("large pizza?") may be tagged ([SIZE="large"] and [ITEM="pizza"]) by the NLU module 140 240 so long as silence periods between words in the voice command do not exceed the current timeout threshold. In this particular example, the NLU module 140 240 may progress tagging in the following order: [WANT="can I have"] 720, [QUANTITY="a"] 730, [SIZE="large"] 740, and [ITEM="pizza"] 750. Therefore, the current timeout threshold progressively changes from 2 seconds to 3 seconds, 4 seconds, and 0.5 second, which are timeout thresholds for [WANT?] net 720), [QUANTITY?] net 730, [SIZE?] net 740, and [ITEM?] net 750, respectively.

In another scenario for the same voice command ("Can I have a large pizza?"), let's assume a user takes really long pause (e.g., longer than 4 seconds) between "Can I have a large" and "pizza." When the recognized text "pizza" is finally received from the ASR module 130 230, the NLU module 140 240 may have already completed tagging for [WANT="can I have"] 720, [QUANTITY="a"] 730, and [SIZE="large"] 740. The current timeout threshold at this time would be 4 seconds, which is the timeout threshold for the last tagging net (i.e., [SIZE="large"] 740). Since the silence period is longer than the current timeout threshold (i.e., 4 seconds), the NLU module 140 240 may determine it detect an end-point of user's voice command and may transmit the detected sentence ("can I have a large") to other processing blocks although the detection of end-point is incorrect. Alternatively, in accordance with the present disclosure, the NLU module 140 240 may check if there is any unflagged net(s) in the shortest path from the current net (i.e., [SIZE?] net 740) to End net 790. In this particular example, [ITEM?] net 750 is located in the shortest path, which means it may be a compulsory net, and it is still unflagged. Thus, the NLU module 140 240 may follow up with a user by asking, for example, "what item are you looking for?". In case the ASR system 100 maintain user's prior history of similar voice commands associated with the same or similar context (e.g., pizza ordering context, or product ordering context), the ASR system 100 may refine the follow up questions based on information from the prior history. For example, if the prior history indicates that the user frequently placed an order for ordering "pizza" or "garlic bread," the follow question for [ITEM?] net 750 would likely be "would that be a large pizza or a large portion of garlic bread?" instead of "what item are you looking for?".

In another implementation, the NLU module 140 240, in response to detect that [ITEM?] net 750 is still unflagged, may adjust or augment the current timeout threshold from 4 seconds to say 5 seconds. The prior history of context based conversations by a user may be used to determine the timeout threshold for each net. For example, let's assume the prior history, based on a number of prior conversations over a long period of time, shows that [ITEM?] 750 was usually followed by [TOPPING?] 760, but [TOPPING?] 760 was usually not followed by anything. Since the frame 700 shows [ITEM?] 750 can go directly to End net 790 or [TOPPING?] 760, the ASR system 100 may set the timeout threshold (e.g., 0.5 second) for [ITEM?] 750 to a slightly higher value (e.g., 0.25 second) than that of [TOPPING?] 760. The prior history of context based conversations by a user may be used to update the timeout threshold for each net. For example, let's assume the prior history shows that a particular user tends to pause longer right after [ITEM?] 750 than after [SIZE?] 740. In this case, [ITEM?] 750 may have a longer timeout threshold (e.g., 2 seconds instead of 0.5 second) and [SIZE?] 740 may have a shorter timeout threshold (e.g., 1 second instead of 3 seconds).

Figure 8:
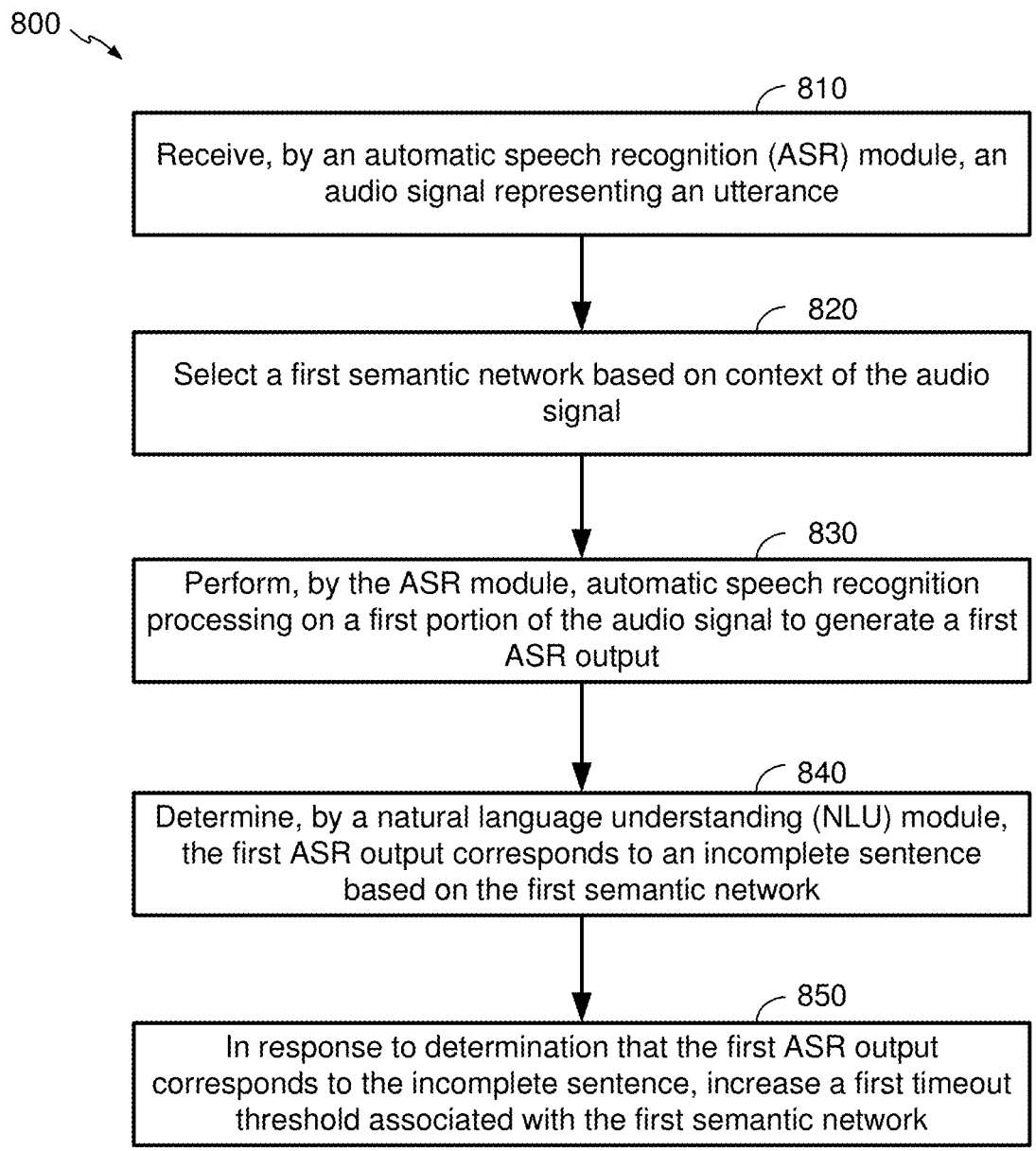
FIG. 8 is a flow chart illustrating an example of a method of detecting the end-point of audio signal representing an utterance.

FIG. 8 is a flow chart illustrating an example of a method of detecting the end-point of audio signal representing an utterance. The method 800 may be performed by a local device 110 of FIG. 1. For example, the method 800 may be performed by a processor 120 including the ASR module 130 230 or the NLU module 140 240.

The method 800 includes receiving, by an ASR module, an audio signal representing an utterance, at 810. In a particular example, the ASR module 130 230 may receive an audio signal including a user's command via an audio I/O module 160. The method 800 includes selecting a first semantic network based on context of the audio signal, at 820. In a particular example, either the NLU module 140 240 or the ASR module 130 230 may determine context of the input audio signal, and may select a particular semantic network or a frame among a gramma file based on the determined context information. A gramma file may be stored in the memory 170 and may be accessible to either the ASR module 130 230 or the NLU module 140 240.

The method 800 includes performing, by the ASR module, automatic speech recognition processing on a first portion of the audio signal to generate a first ASR output, at 830. In a particular example, the ASR module 130 230 may perform ASR processing and generate at least one ASR output 235 at certain time interval. For example, the time interval may be fixed based on a timer (e.g., at every 500 msec), or may vary based on characteristics of the audio signal. The ASR module 130 230 may transmit the at least one ASR output 235 to the NLU module 140 240 for further processing.

The method 800 further includes determining, by a NLU module, the first ASR output corresponds to an incomplete sentence based on the first semantic network, at 840. In a particular example, the NLU module 140 240 may determine the ASR output received from the ASR module 130 230 corresponds to an incomplete sentence. This determination 840 may be based on the first selected network selected at least partially based on the context information of the audio signal as was described with respect to FIGS. 3-7. For example, this determination 840 may be based on comparison of each silence period of nets of the first selected network with at least a particular timeout threshold associated with at least one nets of the first selected network.

Figure 9:
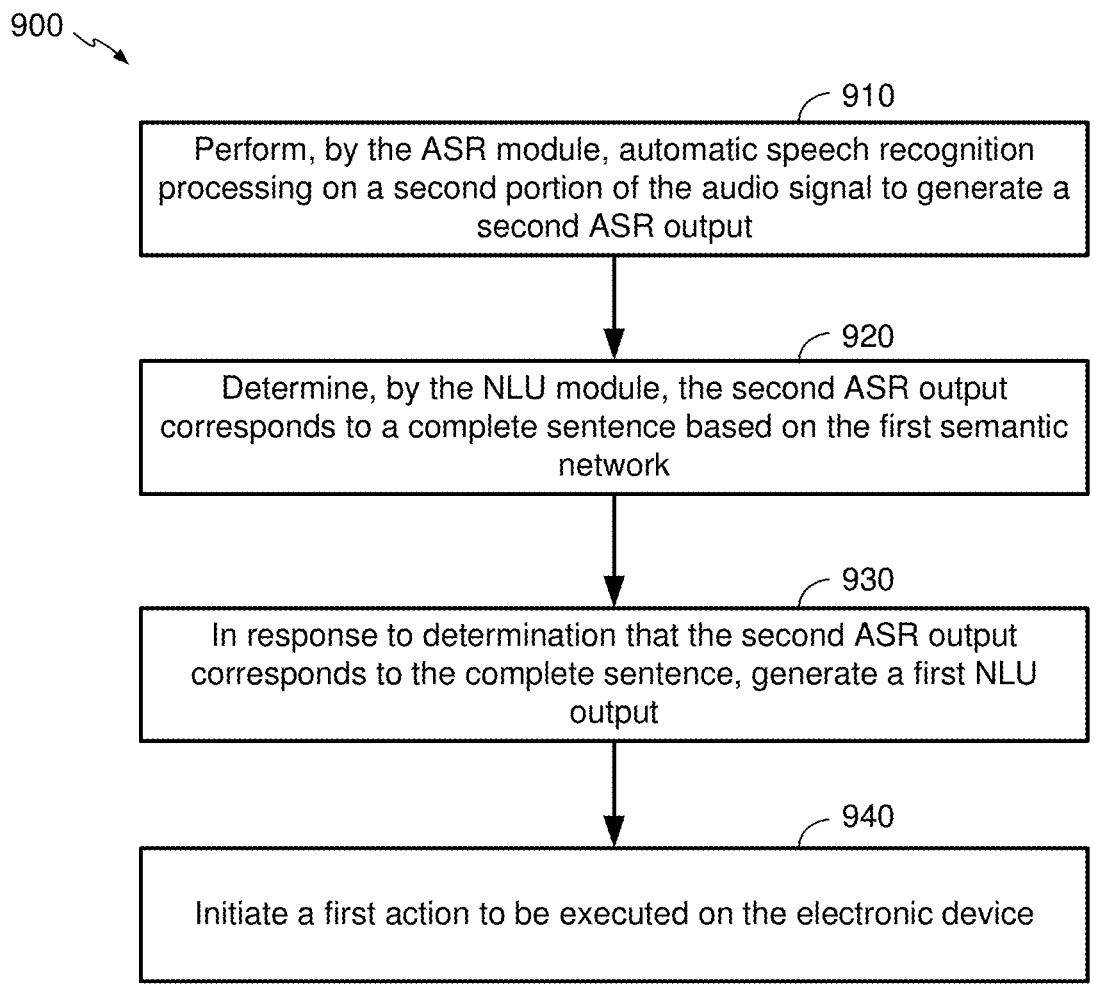
FIG. 9 is a flow chart illustrating another example of a method of detecting the end-point of audio signal representing an utterance.

The method 800 includes increasing a first timeout threshold associated with the first semantic network in response to determination that the first ASR output corresponds to the incomplete sentence at 850. In a particular example, the NLU module 140 240 may increase the timeout threshold for a current net (i.e., the net that was just tagged most recently) upon determining that at least one ASR output 235 received from the ASR module 130 230 may correspond to incomplete sentence. For example, the NLU module 140 240 may determine the ASR output 235 is incomplete (or incomplete sentence) when at least one compulsory net is still unflagged. The NLU module 140 240 may also increase the timeout threshold for a current net at least partially based on a prior history of voice commands. The voice commands may be associated with the current semantic network FIG. 9 shows a flow chart illustrating another example of a method of detecting the end-point of audio signal representing an utterance. The method 900 may be performed by a local device 110 of FIG. 1. For example, the method 900 may be performed by a processor 120 including the ASR module 130 230 or the NLU module 140 240. In some implementation, the method 900 may follow the steps included in the method 800 in FIG. 8.

The method 900 includes performing, by the ASR module, ASR processing on a second portion of the audio signal to generate a second ASR output, at 910. In a particular example, the ASR module 130 230 may perform ASR processing and generate at least one ASR output 235 at certain time interval. For example, the ASR module 130 230 may perform ASR processing on a second portion of the audio signal in response to the determination, by the NLU module 140 240, at least one previous ASR output 235 was incomplete sentence. For example, the NLU module 140 240 may determine the ASR output 235 is incomplete (or incomplete sentence) when at least one compulsory net is still unflagged. The ASR module 130 230 may transmit the at least one ASR output 235 to the NLU module 140 240 for further processing.

The method 900 includes determining, by the NLU module, the second ASR output corresponds to a complete sentence based on the first semantic network, at 920. In a particular example, the NLU module 140 240 may determine at least one ASR output received from the ASR module 130 230 corresponds to a complete sentence. This determination 920 may be based on the first selected network selected at least partially based on the context information of the audio signal as was described with respect to FIGS. 3-7. For example, this determination 920 may be based on whether all the compulsory net in the selected first semantic network is already flagged or not, or alternatively whether the current net during semantic tagging process successfully traversed to the End net 390 590 690 790.

The method 900 includes generating a first NLU output, in response to determination that the second ASR output corresponds to the complete sentence, at 930. In a particular example, the NLU module 140 240 may generate the NLU output 245 in response to determination at least one ASR output received from the ASR module 130 230 corresponds to the complete sentence. The NLU module 140 240 may transmit the NLU output 245 to other downstream processing block. In some implementation, the other downstream processing block may further include dialogue manager (DM) 260, natural language generator (NLG) 270, text-to-speech (TTS) conversion module 280, or any other blocks that may be used to take an action in responsive to the NLU output 245.

The method 900 includes initiating a first action to be executed on the electronic device, at 940. In a particular example, the step 940 may be performed by a local device 110 of FIG. 1. The action may include any action that may be reasonably anticipated in response to successfully recognized voice commend by the ASR system 100. For example, this action may include "initiating a call" in response to the recognized voice command of "call Anthony," or "launching music play application" in response to the recognized voice command of "play my favorite song."

In particular aspects, the method 800 of FIG. 8 or the method 900 of FIG. 9 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 800 of FIG. 8 or the method 900 of FIG. 9 may be performed by a processor that executes instructions, as described with respect to FIG. 10.

Figure 10:
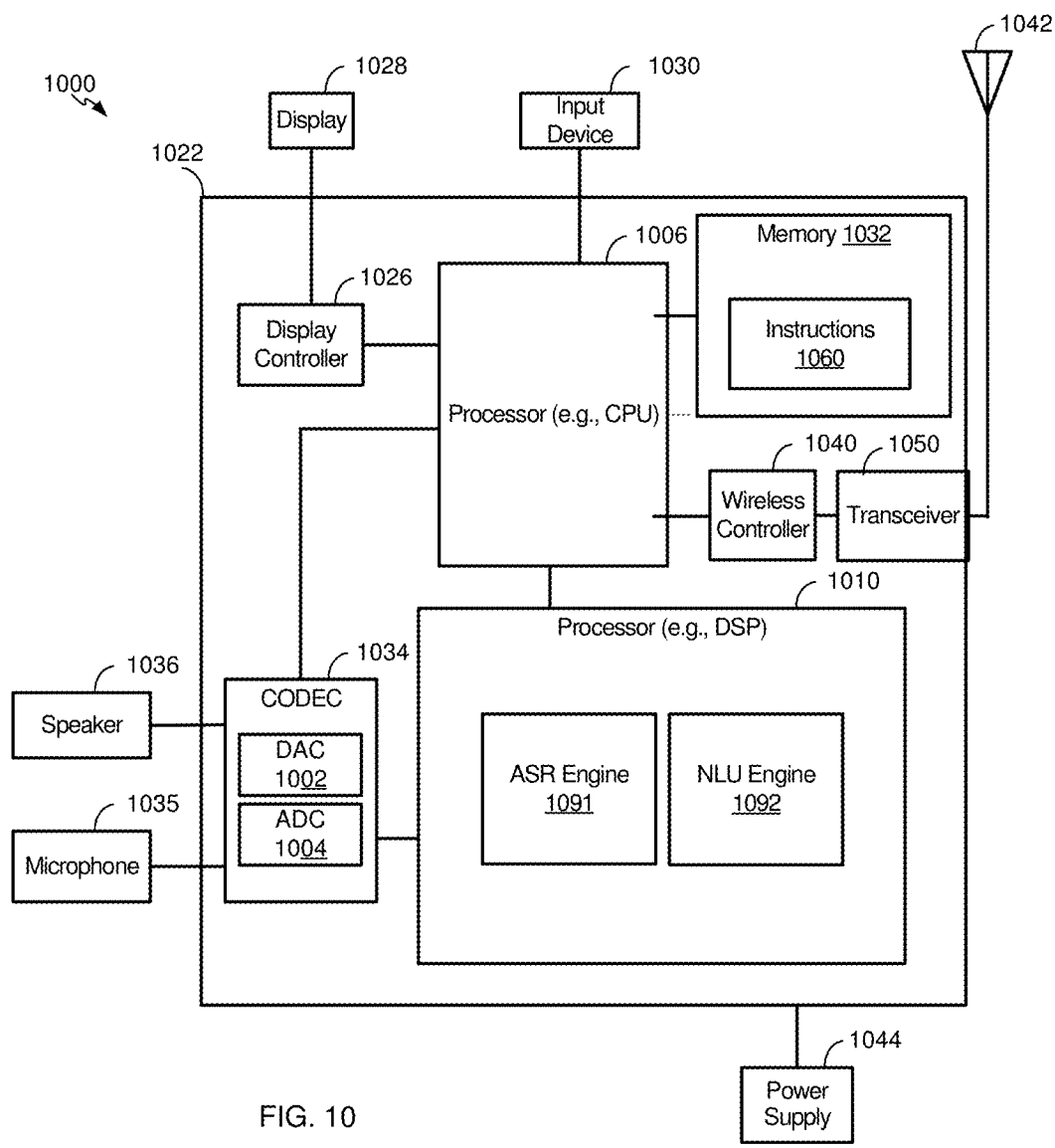
FIG. 10 is a block diagram illustrating a particular example of a device that is operable to perform automatic speech recognition.

FIG. 10 shows a block diagram illustrating a particular example of a device that is operable to perform automatic speech recognition. In various implementations, the device 1000 may have more or fewer components than illustrated in FIG. 10. In an illustrative example, the device 1000 may correspond to the system 100 and may operate according to the method of FIGS. 8-9.

In a particular implementation, the device 1000 includes a processor 1006 (e.g., a CPU). The device 1000 may include one or more additional processors, such as a processor 1010 (e.g., a DSP). The processor 1010 may include ASR engine 1091, NLU engine 1092, or a combination thereof. For example, the ASR engine 1091 may be the ASR module 130 230, and the NLU engine 1092 may be the NLU module 140 240. As another example, the processor 1010 may be configured to execute one or more computer-readable instructions to perform the operations of the ASR engine 1091 or NLU engine 1092. Thus, the CODEC 1008 may include hardware and software. Although the ASR engine 1091 or NLU engine 1092 are illustrated as components of the processor 1010, in other examples one or more components of the ASR engine 1091 or NLU engine 1092 may be included in the processor 1006, a CODEC 1034, another processing component, or a combination thereof.

The device 1000 may include a memory 1032 and the CODEC 1034. The CODEC 1034 may include a digital-to-analog converter (DAC) 1002 and an analog-to-digital converter (ADC) 1004. A speaker 1036, a microphone or a microphone array 1035, or both may be coupled to the CODEC 1034. The CODEC 1034 may receive analog signals from the microphone array 1035, convert the analog signals to digital signals using the analog-to-digital converter 1004, and provide the digital signals to the ASR engine 1091. In some implementations, the ASR engine 1091 or the NLU engine 1092 may provide digital signals to the CODEC 1034. The CODEC 1034 may convert the digital signals to analog signals using the digital-to-analog converter 1002 and may provide the analog signals to the speaker 1036.

The device 1000 may include a wireless controller 1040 coupled, via a transceiver 1050 (e.g., a transmitter, a receiver, or both), to an antenna 1042. The device 1000 may include the memory 1032, such as a computer-readable storage device. The memory 1032 may include instructions 1060, such as one or more instructions that are executable by the processor 1006, the processor 1010, or a combination thereof, to perform one or more of the techniques described with respect to FIGS. 1-7, the method of FIGS. 8-9, or a combination thereof.

As an illustrative example, the memory 1032 may store instructions that, when executed by the processor 1006, the processor 1010, or a combination thereof, cause the processor 1006, the processor 1010, or a combination thereof, to perform one or more of the techniques described with respect to FIGS. 1-7, the method of FIGS. 8-9, or a combination thereof.

The memory 1032 may include instructions 1060 executable by the processor 1006, the processor 1010, the CODEC 1034, another processing unit of the device 1000, or a combination thereof, to perform methods and processes disclosed herein. One or more components of the system 100 of FIG. 1 may be implemented via dedicated hardware (e.g., circuitry), by a processor executing instructions (e.g., the instructions 1060) to perform one or more tasks, or a combination thereof. As an example, the memory 1032 or one or more components of the processor 1006, the processor 1010, the CODEC 1034, or a combination thereof, may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1060) that, when executed by a computer (e.g., a processor in the CODEC 1034, the processor 1006, the processor 1010, or a combination thereof), may cause the computer to perform at least a portion of the methods of FIGS. 8-9, or a combination thereof. As an example, the memory 1032 or the one or more components of the processor 1006, the processor 1010, the CODEC 1034 may be a non-transitory computer-readable medium that includes instructions (e.g., the instructions 1060) that, when executed by a computer (e.g., a processor in the CODEC 1034, the processor 1006, the processor 1010, or a combination thereof), cause the computer perform at least a portion of the method of FIGS. 8-9, or a combination thereof.

In a particular implementation, the device 1000 may be included in a system-in-package or system-on-chip device 1022. In some implementations, the memory 1032, the processor 1006, the processor 1010, the display controller 1026, the CODEC 1034, the wireless controller 1040, and the transceiver 1050 are included in a system-in-package or system-on-chip device 1022. In some implementations, an input device 1030 and a power supply 1044 are coupled to the system-on-chip device 1022. Moreover, in a particular implementation, as illustrated in FIG. 10, the display 1028, the input device 1030, the speaker 1036, the microphone array 1035, the antenna 1042, and the power supply 1044 are external to the system-on-chip device 1022. In other implementations, each of the display 1028, the input device 1030, the speaker 1036, the microphone array 1035, the antenna 1042, and the power supply 1044 may be coupled to a component of the system-on-chip device 1022, such as an interface or a controller of the system-on-chip device 1022. In an illustrative example, the device 1000 corresponds to a communication device, a mobile communication device, a smartphone, a cellular phone, a laptop computer, a computer, a tablet computer, a personal digital assistant, a set top box, a display device, a television, a gaming console, a music player, a radio, a digital video player, a digital video disc (DVD) player, an optical disc player, a tuner, a camera, a navigation device, a decoder system, an encoder system, a base station, a vehicle, or any combination thereof.

In the aspects of the description described above, various functions performed have been described as being performed by certain components or modules, such as components or module of the system 100 of FIG. 1. However, this division of components and modules is for illustration only. In alternative examples, a function performed by a particular component or module may instead be divided amongst multiple components or modules. Moreover, in other alternative examples, two or more components or modules of FIG. 1 may be integrated into a single component or module. Each component or module illustrated in FIG. 1 may be implemented using hardware (e.g., an ASIC, a DSP, a controller, a FPGA device, etc.), software (e.g., instructions executable by a processor), or any combination thereof.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the aspects disclosed herein may be included directly in hardware, in a software module executed by a processor, or in a combination of the two. A software module may reside in RAM, flash memory, ROM, PROM, EPROM, EEPROM, registers, hard disk, a removable disk, a CD-ROM, or any other form of non-transient storage medium known in the art. A particular storage medium may be coupled to the processor such that the processor may read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein and is to be accorded the widest scope possible consistent with the principles and novel features as defined by the following claims.

What is claimed is:

1. A method for processing an audio signal by an electronic device, the method comprising:
   receiving, by an automatic speech recognition (ASR) module, the audio signal representing an utterance of a user;
   selecting, by the ASR module, a first semantic network based on context of the audio signal, wherein the first semantic network comprises a plurality of slots, each slot of the plurality of slots associated with a set of words;
   generating, based on automatic speech recognition processing performed on a first portion of the audio signal by the ASR module, a first ASR output that indicates one or more words identified in the utterance and an end time of the utterance;
   associating, by the ASR module and based on the first ASR output, the one or more words with one or more slots of the plurality of slots; and
   in response to a determination that passage of time after the end time of the utterance exceeds a timeout threshold amount of time associated with a last filled slot of the one or more slots:
      determining an amount of time of time to adjust the timeout threshold amount of time, wherein a duration of the amount of time is determined based on data for the user; and
      augmenting the timeout threshold amount of time associated with the last filled slot by the determined amount of time to adjust the timeout threshold, wherein the data is associated with the first semantic network.

2. The method of claim 1, wherein selecting the first semantic network based on the context of the audio signal comprises determining the context of the audio signal based on at least a portion of the first ASR output.

3. The method of claim 2, wherein selecting the first semantic network based on the context of the audio signal further comprises selecting the first semantic network from a plurality of semantic networks based on the context.

4. The method of claim 3, wherein at least one semantic network of the plurality of semantic networks corresponds to a recursive transition network (RTN).

5. The method of claim 1, further comprising:
   parsing the first ASR output based on a predetermined grammar to generate parsed first ASR output;
   determining, based on the parsed first ASR output, the first ASR output corresponds to an incomplete sentence; and
   comparing the parsed first ASR output with the first semantic network.

6. The method of claim 5, wherein comparing the parsed first ASR output with the first semantic network comprises:
   identifying a first portion of the parsed first ASR output that corresponds to a first slot among the plurality of slots associated with the first semantic network; and
   identifying a second portion of the parsed first ASR output that does not correspond to a second slot among the plurality of slots associated with the first semantic network.

7. An apparatus for processing an audio signal, the apparatus comprising:
at least one processor; and
a memory coupled to the at least one processor, the memory including instructions executable to cause the at least one processor to:
receive, by an automatic speech recognition (ASR) module, the audio signal representing an utterance of a user;
select a first semantic network based on context of the audio signal, wherein the first semantic network comprises a plurality of slots, each slot of the plurality of slots associated with a set of words;
generate, based on automatic speech recognition processing performed on a first portion of the audio signal by the ASR module, a first ASR output that indicates one or more words identified in the utterance and an end time of the utterance;
associate the one or more words of the first ASR output with one or more slots of the plurality of slots; and
in response to a determination that passage of time after the end time of the utterance exceeds a timeout threshold amount of time associated with a last filled slot of the one or more slots:
determine an amount of time of time to adjust the timeout threshold amount of time, wherein a duration of the amount of time is determined based on data for the user; and
augment the timeout threshold amount of time associated with the last filled slot by the determined amount of time to adjust the timeout threshold, wherein the data is associated with the first semantic network.

8. The apparatus of claim 7, wherein, to select the first semantic network, the at least one processor is configured to determine the context of the audio signal based on at least a portion of the first ASR output.

9. The apparatus of claim 7, wherein the at least one processor is configured to select the first semantic network by selecting the first semantic network from a plurality of semantic networks based on the context.

10. The apparatus of claim 7, wherein:
the data for the user includes a history of prior utterances of the user, the prior utterances of the user occurred prior to the utterance of the user; and
each slot of the plurality of slots corresponds to a threshold time for the slot that indicates a time span after the slot is filled and during which one or more additional words are detectable in the audio signal before a timeout determination.

11. An apparatus for processing an audio signal, the apparatus comprising:
means for receiving the audio signal representing an utterance of a user;
means for selecting a first semantic network based on context of the audio signal, wherein the first semantic network comprises a plurality of slots, each slot of the plurality of slots associated with a set of words;
means for generating, based on automatic speech recognition processing performed on a first portion of the audio signal, a first ASR output, the first ASR output including one or more words identified in the utterance and an end time of the utterance;
means for associating one or more words of the first ASR output with one or more slots of the plurality of slots;
means for determining whether a passage of time after the end time of the utterance exceeds a timeout threshold amount of time associated with a last filled slot of the one or more slots;
means for determining an amount of time of time to adjust the timeout threshold amount of time, wherein a duration of the amount of time is determined based on data for the user; and
means for augmenting the timeout threshold amount of time associated with the last filled slot by the determined amount of time to adjust the timeout threshold in response to a determination by the means for determining that the passage of time after the end time of the utterance exceeds the timeout threshold amount of time, wherein the data is associated with the first semantic network.

12. The apparatus of claim 11, wherein the means for selecting the first semantic network based on the context of the audio signal comprises means for determining the context of the audio signal based on at least a portion of the first ASR output.

13. A non-transitory computer-readable medium comprising instructions that, when executed by a processor, cause the processor to perform operations comprising:
receiving, by an automatic speech recognition (ASR) module, an audio signal representing an utterance of a user;
selecting a first semantic network based on context of the audio signal, wherein the first semantic network comprises a plurality of slots, each slot of the plurality of slots associated with a set of words;
generating, based on automatic speech recognition processing performed on a first portion of the audio signal by the ASR module, a first ASR output that indicates one or more words identified in the utterance and an end time of the utterance;
associating the one or more words of the first ASR output with one or more slots of the plurality of slots; and
in response to a determination that passage of time after the end time of the utterance exceeds a timeout threshold amount of time associated with a last filled slot of the one or more slots:
determining an amount of time of time to adjust the timeout threshold amount of time, wherein a duration of the amount of time is determined based on data for the user; and
augmenting, by the ASR module, the timeout threshold amount of time associated with the last filled slot by the determined amount of time to adjust the timeout threshold, wherein the data is associated with the first semantic network.

14. The non-transitory computer-readable medium of claim 13, wherein selecting the first semantic network based on the context of the audio signal comprises determining the context of the audio signal based on at least a portion of the first ASR output.

15. The non-transitory computer-readable medium of claim 13, wherein selecting the first semantic network based on the context of the audio signal further comprises selecting the first semantic network from a plurality of semantic networks based on the context.

16. The apparatus of claim 7, wherein the at least one processor is configured to determine, prior to expiration of the augmented timeout threshold amount of time, whether a word of a second portion of the audio signal corresponds to at least one slot of the plurality of slots that is after the one or more slots.

17. The apparatus of claim 16, wherein the at least one processor is configured to:
perform automatic speech recognition processing on the first portion of the audio signal to generate the first ASR output; and
perform automatic speech recognition processing on the second portion of the audio signal to generate a second ASR output that indicates the word.

18. The apparatus of claim 7, wherein:
a first slot of the plurality of slots is associated with a first threshold time having a first value,
a second slot of the plurality of slots is associated with a second threshold time having a second value,
the first value different from the second value; and
the plurality of slots include compulsory slots, wherein each compulsory slot is configured to be filled for a determination that the utterance corresponds to a complete sentence.

19. The apparatus of claim 18, wherein:
the timeout threshold amount of time associated with the last filled slot is augmented in response to:
the determination that the passage of time after the end time of the utterance exceeds the timeout threshold amount of time associated with a last filled slot of the one or more slots; and
a determination that at least one compulsory slot of the compulsory slots is unfilled; and
the plurality of slots includes at least one optional slot, wherein the determination that the utterance corresponds to a complete sentence is determinable independent of the optional slot being filled.

20. The apparatus of claim 7, wherein:
the at least one processor is configured to, for each slot of the plurality of slots, determine, based on the context, the set of words associated with the slot; and
wherein:
a first slot of the plurality of slots is associated with a first set of one or more words of the set of words, the first set of one or more words based on the context;
a second slot of the plurality of slots is associated with a second set of one or more words of the set of words, the second set of one or more words based on the context; and
the first set of one or more words is different from the second set of one or more words, and wherein the set of words is based on the context.

* * * * *